(12) United States Patent
He et al.

(10) Patent No.: US 12,243,183 B2
(45) Date of Patent: Mar. 4, 2025

(54) FISHEYE IMAGE TRANSFORMATION ALGORITHM BASED ON VIRTUAL SPHERES

(71) Applicant: OMNIVISION TECHNOLOGIES (SHANGHAI) CO., LTD., Shanghai (CN)

(72) Inventors: Biao He, Santa Clara, CA (US); Yanyan Liu, Shanghai (CN)

(73) Assignee: OMNIVISION TECHNOLOGIES (SHANGHAI) CO., LTD., Shanghai (CN)

( * ) Notice: Subject to any disclaimer, the term of this patent is extended or adjusted under 35 U.S.C. 154(b) by 330 days.

(21) Appl. No.: 17/820,153

(22) Filed: Aug. 16, 2022

(65) Prior Publication Data

US 2023/0401669 A1 Dec. 14, 2023

(30) Foreign Application Priority Data

Jun. 9, 2022 (CN) .......................... 202210663587.9

(51) Int. Cl.
*G06T 3/047* (2024.01)
*G06T 3/12* (2024.01)

(52) U.S. Cl.
CPC ................ *G06T 3/047* (2024.01); *G06T 3/12* (2024.01)

(58) Field of Classification Search
None
See application file for complete search history.

(56) References Cited

U.S. PATENT DOCUMENTS

2022/0366547 A1* 11/2022 Powell ...................... G06T 5/80

FOREIGN PATENT DOCUMENTS

CN 104835117 B * 12/2020
EP 3093822 A1 * 11/2016 ............... G06T 7/20

* cited by examiner

*Primary Examiner* — Aaron M Richer
(74) *Attorney, Agent, or Firm* — WOMBLE BOND DICKINSON (US) LLP

(57) ABSTRACT

A fisheye image transformation algorithm based on virtual spheres is provided, comprising: defining a real camera coordinate system O-XYZ and a virtual camera coordinate system O2-X2Y2Z2, wherein a small virtual sphere centered at O with a radius of 1 and a large virtual sphere centered at O2 with a radius of n are defined, the small sphere is internally tangent to the large sphere; transforming a fisheye image to 3D unit vectors in the real camera coordinate system, transforming the 3D unit vectors between the real camera coordinate system and the virtual camera coordinate system according to a relative position between two spheres, and conducting conventional projection of the 3D unit vectors in the virtual camera coordinate system to generate the transformed image; and reducing the line curvature of the transformed image to a certain degree by adjusting the HFOV angle or the VFOV angle of the virtual camera.

11 Claims, 6 Drawing Sheets

FISHEYE IMAGE TRANSFORMATION ALGORITHM BASED ON VIRTUAL SPHERES

CROSS-REFERENCE TO RELATED APPLICATION

This application claims the priority of Chinese patent application number 202210663587.9, filed on Jun. 9, 2022, the entire contents of which are incorporated herein by reference.

TECHNICAL FIELD

The present invention relates to the field of image processing and, in particular, to a fisheye image transformation algorithm based on virtual spheres.

BACKGROUND

A fisheye lens is an imaging lens with a short focal length and a large field of view (FOV) (with an FOV angle of about 180 degrees). The name "fisheye lens" is given because it has a convex front portion that looks like a real fish eye. Compared with the human crystalline lens that is oblate and enables the eyes to see more distant objects, however, fish crystalline lenses are spherical and, therefore, although fish eyes can only see nearby objects, they have a wider angle of view, i.e., they can see objects in a wider range.

Thanks to their inherent advantages, fisheye lenses have been widely used in various applications. However, images captured by fisheye lenses are strongly distorted. Before such strongly distorted fisheye images can be used in practical applications, the distortion must be reduced or eliminated to make the images with an improved angle of view effect and more compatible with our visual habits.

SUMMARY OF THE INVENTION

It is an object of the present invention to provide a fisheye image transformation algorithm based on virtual spheres, which enables reduced line curvature of the transformed image at the same HFOV or VFOV angle of a real camera, allowing the transformed image to have an improved visual effect.

To this end, the present invention provides a fisheye image transformation algorithm based on virtual spheres, which comprises: defining a real camera coordinate system O-XYZ and a virtual camera coordinate system O2-X2Y2Z2, wherein a small virtual sphere centered at O with a radius of 1 and a large virtual sphere centered at O2 with a radius of n are defined, and wherein the small sphere is internally tangent to the large sphere; transforming a fisheye image to three-dimensional (3D) unit vectors in the real camera coordinate system, transforming the 3D unit vectors between the real camera coordinate system and the virtual camera coordinate system according to a relative position between two spheres, and conducting conventional projection of the 3D unit vectors in the virtual camera coordinate system to generate the transformed image; and reducing the line curvature of the transformed image to a certain degree by adjusting the angle of the horizontal field of view (HFOV) or that of the vertical field of view (VFOV) of the virtual camera.

Optionally, coordinate transformation of the fisheye image may comprise a forward transformation and a reverse transformation, and wherein:

the forward transformation comprises acquiring coordinates (x0, y0) of the fisheye image; deriving a three-dimensional (3D) unit vector (i0, j0, k0) in the real camera coordinate system using a camera model; deriving a 3D unit vector (i1, j1, k1) in the virtual camera coordinate system based on a coordinate transformation between the small and large spheres; and deriving coordinates (x1, y1) in the transformed image by a conventional projection, the reverse transformation comprises acquiring the coordinates (x1, y1) in the transformed image; deriving the 3D unit vector (i1, j1, k1) in the virtual camera coordinate system based on the reverse conventional projection; deriving the 3D unit vector (i0, j0, k0) in the real camera coordinate system based on the coordinate transformation between the large and small spheres; and deriving the coordinates (x0, y0) in the fisheye image using the camera model.

Optionally, in the reverse transformation, deriving the 3D unit vector (i0, j0, k0) based on the 3D unit vector (i1, j1, k1) may comprise:

acquiring coordinates (i1*n, j1*n, k1*n) in the coordinate system O2-X2Y2Z2 of the intersection of (i1, j1, k1) and the large sphere;

acquiring a vector (i1*n, j1*n, k1*n+(n−1)) of the intersection in the coordinate system O-XYZ; and normalizing the vector to the 3D unit vector (i0, j0, k0).

Optionally, in the forward transformation, the 3D unit vector (i1, j1, k1) may be derived based on the 3D unit vector (i0, j0, k0) according to equation (1):

$$\begin{cases} i1 = i0*m/n \\ j1 = j0*m/n \\ k1 = (k0*m-(n-1))/n \end{cases}, \text{ where} \quad (1)$$

$$m = k0*(n-1) + \sqrt{k0^2*(n-1)^2 + 2*n - 1}. \quad (2)$$

Optionally, equation (3) may be derived from the relative position between the two spheres, equation (4) may be derived based on equation (3), and equation (2) may be derived based on equation (4):

$$\begin{cases} i1*n = i0*m \\ j1*n = j0*m \\ k1*n + (n+1) = k0*m \\ i0*i0 + j0*j0 + k0*k0 = 1 \\ i1*i1 + j1*j1 + k1*k1 = 1 \\ m > 0, n > 1 \end{cases}, \quad (3)$$

$$\begin{cases} m^2 - 2*k0*(n-1)*m - 2*n + 1 = 0 \\ m > 0, n > 1 \end{cases} \quad (4)$$

where m is an intermediate variable.

Optionally, the conventional projection may comprise a cylindrical projection, an equirectangular projection or an equidistant projection, wherein the relationship between the HFOV and VFOV angles of the virtual camera is determined by the projection method and the aspect ratio of the transformed image.

Optionally, with the HFOV angle of the real camera being configured as 2δ and the HFOV angle of the virtual camera as 2β, equation (5) may be derived based on the relative position between the two spheres, and equation (6) for calculating n, the radius of the large sphere, may be derived based on equation (5):

$$\sin\delta*(n*\cos\beta-n+1)=n*\sin\beta*\cos\delta, 0<\beta<\delta<\pi, \quad (5)$$

$$n=\sin\delta/(\sin\delta-\sin(\delta-\beta)), \quad (6)$$

wherein in order to make the radius of the large sphere, n>1, δ and β need to satisfy equation (7):

$$\begin{cases} 0<\beta<\delta, & \text{if } 0<\delta\leq\pi/2 \\ 2*\delta-\pi<\beta<\delta, & \text{if } \pi/2<\delta<\pi \end{cases} \quad (7)$$

Optionally, with the VFOV angle of the virtual camera being configured as 2α and a VFOV angle of the real camera as 2θ, and with the width of the transformed image being configured as W and the height thereof as H, in case of cylindrical projection being used, equation (8) for calculating α may be derived:

$$\alpha = \arctg(\beta*H/W), \alpha<\pi/2, \quad (8)$$

wherein in case of the equirectangular or equidistant projection being used, equation (9) for calculating α may be derived:

$$\alpha=\beta*H/W. \quad (9)$$

Optionally, equation (10) may be derived based on the relative position between the two spheres and equation (11) for calculating θ may be derived according to equation (10):

$$\sin\theta*(n*\cos\alpha-n+1)=n*\sin\alpha*\cos\theta, \ 0<\alpha<\theta<\pi, \quad (10)$$

$$val=n*\cos\alpha-n+1, \ \theta=\begin{cases} \arctg((n*\sin\alpha)/val), & val>0 \\ \pi/2, & val=0 \\ \pi+\arctg((n*\sin\alpha)/val), & val<0 \end{cases}, \quad (11)$$

where val is an intermediate variable.

Optionally, with the VFOV angle of the real camera configured as 2θ and the VFOV angle of the virtual camera as 2α, equation (12) for calculating n, the radius of the large sphere, may be derived based on the relative position between the two spheres:

$$n=\sin\theta/(\sin\theta-\sin(\theta-\alpha)), \quad (12)$$

wherein in order to make the radius of the large sphere, n>1, θ and α need to satisfy equation (13):

$$\begin{cases} 0<\alpha<\theta, & \text{if } 0<\theta\leq\pi/2 \\ 2*\theta-\pi<\alpha<\theta, & \text{if } \pi/2<\theta<\pi \end{cases} \quad (13)$$

Optionally, with the HFOV angle of the virtual camera being configured as 2β and an HFOV angle of the real camera as 2δ, and with the width of the transformed image being configured as W and the height thereof as H, in case of the cylindrical projection being used, equation (14) for calculating β may be derived:

$$\beta=\arctg(\alpha*W/H), \beta<\pi/2, \quad (14)$$

and in case of the equirectangular or equidistant projection being used, equation (15) for calculating β may be derived:

$$\beta=\alpha*W/H. \quad (15)$$

Optionally, equation (16) for calculating δ may be derived based on the relative position between the two spheres:

$$val=n*\cos\beta-n+1, \ \delta=\begin{cases} \arctg((n*\sin\beta)/val), & val>0 \\ \pi/2, & val=0 \\ \pi+\arctg((n*\sin\beta)/val), & val<0 \end{cases}, \quad (16)$$

where val is an intermediate variable.

In the fisheye image transformation algorithm based on virtual spheres provided in the present invention, first, defining the real camera coordinate system O-XYZ and the virtual camera coordinate system O2-X2Y2Z2, wherein the small virtual sphere centered at O with a radius of 1 and the large virtual sphere centered at O2 with a radius of n are defined. The small sphere is internally tangent to the large sphere. Next, a fisheye image is transformed to 3D unit vectors in the real camera coordinate system, the 3D unit vectors are transformed between the real camera coordinate system and the virtual camera coordinate system according to a relative position between two spheres, and the transformed image is generated by conducting conventional projection of the 3D unit vectors in the virtual camera coordinate system. The line curvature of the transformed image can be reduced to a certain degree by adjusting the angle of the HFOV or VFOV of the virtual camera. In this way, with the HFOV or VFOV angle of the real camera being maintained constant, reduced line curvature is achieved, resulting in an improved visual effect of the transformed image. Further, an FOV angle range of 0 to 360 degrees is supported, which covers all fisheye lenses.

Further, the fisheye image transformation algorithm based on virtual spheres provided in the present invention comprises conventional projections including cylindrical projection, equirectangular projection and equidistant projection. It can be used in combination with multiple conventional projection methods to provide various transformation styles.

BRIEF DESCRIPTION OF THE DRAWINGS

Those of ordinary skill in the art would appreciate that the following drawings are presented merely to enable a better understanding of the present invention rather than to limit the scope thereof in any sense.

DETAILED DESCRIPTION

Objects, features and advantages of the present invention will become more apparent upon reading the following more detailed description of the present invention, which is set forth by way of particular embodiments with reference to the accompanying drawings. Note that the figures are provided in a very simplified form not necessarily drawn to exact scale and for the only purpose of facilitating easy and clear description of the embodiments. In addition, the structures shown in the figures are usually partially representations of their actual counterparts. In particular, as the figures would have different emphases, they are sometimes drawn to different scales.

As used herein, the singular forms "a", "an" and "the" include plural referents, unless the context clearly dictates otherwise. As used herein, the term "or" is generally employed in the sense of "and/or", term "several" is generally employed in the sense of "at least one", and term "at least two" is generally employed in the sense of "two or more than two". Additionally, the use of the terms "first", "second" and "third" herein is intended for illustration only and is not to be construed as denoting or implying relative importance or as implicitly indicating the numerical number of the referenced item. Accordingly, defining an item with "first", "second" or "third" is an explicit or implicit indication of the presence of one or at least two of the item, unless the context clearly dictates otherwise.

The present invention provides a fisheye image transformation algorithm based on virtual spheres, which includes: defining a real camera coordinate system O-XYZ and a virtual camera coordinate system O2-X2Y2Z2, wherein a small virtual sphere centered at O with a radius of 1 and a large virtual sphere centered at O2 with a radius of n are defined, and the small sphere is internally tangent to the large sphere; transforming a fisheye image to three-dimensional (3D) unit vectors in the real camera coordinate system, transforming the 3D unit vectors between the real camera coordinate system and the virtual camera coordinate system according to a relative position between two spheres, and conducting a conventional projection of the 3D unit vectors in the virtual camera coordinate system to generate the transformed image; and reducing the line curvature of the transformed image to a certain degree by adjusting the HFOV angle or the VFOV angle of the virtual camera.

Figure 1:
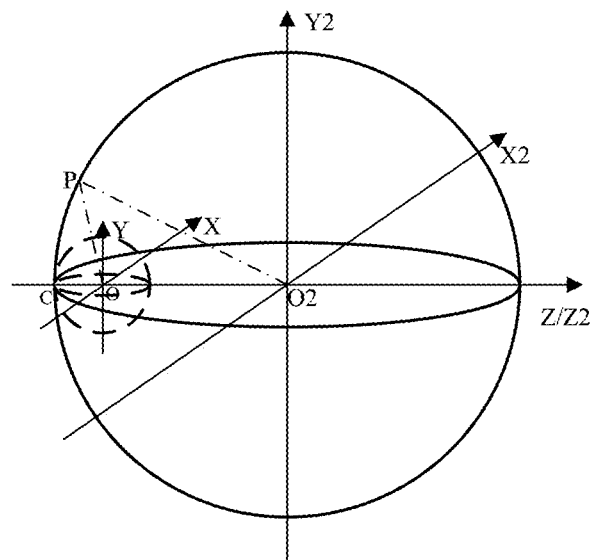
FIG. 1 is a schematic diagram showing a relative position between a real camera coordinate system and a virtual camera coordinate system according to an embodiment of the present invention.

FIG. 1 is a schematic diagram showing a relative position between the real and virtual camera coordinate systems according to an embodiment of the present invention. Referring to FIG. 1, defining the real camera coordinate system O-XYZ and the virtual camera coordinate system O2-X2Y2Z2, wherein a small virtual sphere centered at O with a radius of 1 and the large virtual sphere centered at O2 with a radius of n are defined. The small sphere is internally tangent to the large sphere at point C.

Coordinate transformation of the fisheye image includes forward transformation and reverse transformation. The forward transformation includes: acquiring coordinates (x0, y0) of the fisheye image; deriving a 3D unit vector (i0, j0, k0) in the real camera coordinate system based on a camera model; deriving a 3D unit vector (i1, j1, k1) in the virtual camera coordinate system based on coordinate transformation between the small and large spheres; and deriving coordinates (x1, y1) in the transformed image based on conventional projection.

In the forward transformation, the 3D unit vector (i1, j1, k1) in the virtual camera coordinate system can be derived from the 3D unit vector (i0, j0, k0) in the real camera coordinate system according to equation (1). In particular, this calculation process may involve: deriving equation (3) based on the relative position between the two spheres, where m is an intermediate variable; then deriving equation (4) based on equation (3); subsequently, deriving equation (2) based on equation (4). These equations are listed below:

$$\begin{cases} i1 = i0*m/n \\ j1 = j0*m/n \\ k1 = (k0*m - (n-1))/n \end{cases} \quad (1)$$

$$m = k0*(n-1) + \sqrt{k0^2*(n-1)^2 + 2*n - 1} \quad (2)$$

$$\begin{cases} i1*n = i0*m \\ j1*n = j0*m \\ k1*n + (n-1) = k0*m \\ i0*i0 + j0*j0 + k0*k0 = 1 \\ i1*i1 + j1*j1 + k1*k1 = 1 \\ m > 0, n > 1 \end{cases} \quad (3)$$

$$\begin{cases} m^2 - 2*k0*(n-1)*m - 2*n + 1 = 0 \\ m > 0, n > 1 \end{cases} \quad (4)$$

The reverse transformation includes acquiring the coordinates (x1, y1) in the transformed image; deriving the 3D unit vector (i1, j1, k1) in the virtual camera coordinate system based on reverse conventional projection; deriving the 3D unit vector (i0, j0, k0) in the real camera coordinate system based on coordinate transformation between the large and small spheres; and deriving the coordinates (x0, y0) in the fisheye image using the camera model.

In the reverse transformation, deriving the 3D unit vector (i0, j0, k0) in the real camera coordinate system based on the 3D unit vector (i1, j1, k1) in the virtual camera coordinate system includes: first, acquiring coordinates (i1*n, j1*n, k1*n) in the coordinate system O2-X2Y2Z2 of an intersection point of the 3D unit vector (i1, j1, k1) in the virtual camera coordinate system with the large sphere, such as point P in FIG. 1; acquiring a vector (i1*n, j1*n, k1*n+(n−1)) of the intersection point (i.e., point P) in the coordinate system O-XYZ; finally, normalizing the vector to the unit vector (i0, j0, k0).

The derivation of the 3D unit vector (i0, j0, k0) in the real camera coordinate system based on the camera model and of the coordinates (x1, y1) in the transformed image based on conventional projection in the forward transformation and the derivation of the 3D unit vector (i1, j1, k1) in the virtual camera coordinate system based on reverse conventional projection and of the coordinates (x0, y0) in the fisheye image using the camera model in the reverse transformation can be both accomplished using methods or algorithms known to those skilled in the art, and, therefore, need not be described in further detail herein.

For the real camera, one of its horizontal FOV (HFOV) angle and vertical FOV (VFOV) angle is determined as required by a user, and the other one of them is derived from other parameters, such as HFOV and VFOV angles of the virtual camera and the radius of the large sphere. Moreover, a relationship between the HFOV and VFOV angles of the virtual camera is determined by a projection method and an aspect ratio of the transformed image, and a line curvature of the transformed image can be reduced to a certain degree by adjusting the HFOV or VFOV angle of the virtual camera. Additionally, the aspect ratio of the transformed image can also be determined as required by the user. In this present embodiment, the projection includes cylindrical projection, equirectangular projection or equidistant projection.

An example of deriving the VFOV angle of the real camera 2θ, the VFOV angle of the virtual camera 2α and the radius of the large sphere n from the preset HFOV angle of the real camera 2δ and the preset HFOV angle of the virtual camera 2β will be explained.

Figure 2:
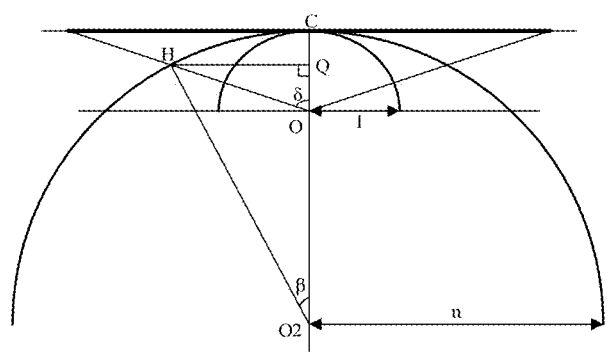
FIG. 2 is a schematic representation of FIG. 1 on an XOZ plane.

FIG. 2 is a schematic representation of FIG. 1 on an XOZ plane. Referring to FIG. 2, the HFOV angle of the real camera is configured as $2\delta$ and the HFOV angle of the virtual camera as $2\beta$. When both $\delta$ and $\beta$ are acute angles, according to the relative position between the two spheres, there exist sin $\delta$=HQ/HO, cos $\delta$=QO/HO, sin $\beta$=HQ/HO2, cos $\beta$=QO2/HO2 and QO2=QO+n−1, from which equation (5) can be derived. From equation (5), equation (6) can be derived, according to which the radius of the large sphere n can be calculated. Equations (5) and (6) are given below.

$$\sin\delta*(n*\cos\beta-n+1)=n*\sin\beta*\cos\delta, 0<\beta<\delta<\pi \quad (5)$$

$$n=\sin\delta/(\sin\delta-\sin(\delta-\beta)) \quad (6)$$

When $\delta$ or $\beta$ is obtuse or right angles, equations (5) and (6) above can be obtained in the same way. Moreover, in order to make the radius of the large sphere n>1, $\delta$ and $\beta$ need to satisfy equation (7):

$$\left\{\begin{array}{ll} 0<\beta<\delta, & \text{if } 0<\delta\le\pi/2 \\ 2*\delta-\pi<\beta<\delta, & \text{if } \pi/2<\delta<\pi \end{array}\right\} \quad (7)$$

Figure 3:
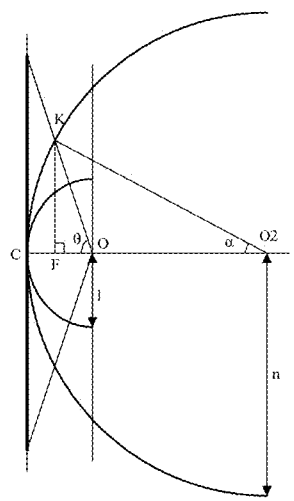
FIG. 3 is a schematic representation of FIG. 1 on a YOZ plane.

FIG. 3 is a schematic representation of FIG. 1 on a YOZ plane. Referring to FIG. 3, with the VFOV angle of the real camera being denoted as $2\theta$, the VFOV angle of the virtual camera as $2\alpha$. Configuring the width of the transformed image as W and the height of the transformed image as H, when cylindrical projection is employed, equation (8) for calculating $\alpha$ can be derived, and therefore, the VFOV angle of the virtual camera $2\alpha$ can be calculated.

$$\alpha=\arctan(\beta*H/W), \alpha<\pi/2 \quad (8)$$

When equirectangular or equidistant projection is employed, equation (9) for calculating $\alpha$ can be derived, and therefore, the VFOV angle of the virtual camera $2\alpha$ can be calculated.

$$\alpha=\beta*H/W \quad (9)$$

When both $\theta$ and $\alpha$ are acute angles, according to the relative position between the two spheres, there exist sin $\theta$=KF/KO, cos $\theta$=FO/KO, sin $\alpha$=KF/KO2, cos $\alpha$=FO2/KO2 and FO2=FO+n−1, from which equation (10) can be derived. Based on equation (10), equation (11) can be derived, according to which the VFOV angle of the real camera $2\theta$ can be calculated. Equations (10) and (11) are given below.

$$\sin\theta*(n*\cos\alpha-n+1)=n*\sin\alpha*\cos\theta, \ 0<\alpha<\theta<\pi, \quad (10)$$

$$val=n*\cos\alpha-n+1, \ \theta=\left\{\begin{array}{ll} \operatorname{arctg}((n*\sin\alpha)/val), & val>0 \\ \pi/2 & val=0 \\ \pi+\operatorname{arctg}((n*\sin\alpha)/val), & val<0 \end{array}\right\} \quad (11)$$

In Equation (11), val is an intermediate variable. When $\theta$ or $\alpha$ is obtuse or right angles, equations (10) and (11) above can be obtained in the same way.

In the above embodiment, the VFOV angles are calculated based on the known HFOV angles. That is, the VFOV angle of the real camera $2\theta$, the VFOV angle of the virtual camera $2\alpha$ and the radius of the large sphere n are calculated based on the known HFOV angle of the real camera $2\delta$ and the known HFOV angle of the virtual camera $\lambda\beta$. Similarly, the HFOV angles can be calculated from the known VFOV angles. That is, the HFOV angle of the real camera $2\delta$, the HFOV angle of the virtual camera $2\beta$ and the radius of the large sphere n can be calculated based on the known VFOV angle of the real camera $2\theta$ and the known VFOV angle of the virtual camera $2\alpha$.

With the VFOV angle of the real camera being configured as $2\theta$ and the VFOV angle of the virtual camera as $2\alpha$, based on the relative position between the two spheres, equation (12) is derived, from which the radius of the large sphere n can be calculated:

$$n=\sin\theta/(\sin\theta-\sin(\theta-\alpha)) \quad (12)$$

Moreover, in order to make the radius of the large sphere n>1, $\theta$ and $\alpha$ needs to satisfy equation (13):

$$\left\{\begin{array}{ll} 0<\alpha<\theta, & \text{if } 0<\theta\le\pi/2 \\ 2*\theta-\pi<\alpha<\theta, & \text{if } \pi/2<\theta<\pi \end{array}\right\} \quad (13)$$

With the width of the transformed image being configured as W and the height thereof as H, when cylindrical projection is employed, equation (14) for calculating $\beta$ can be derived, and therefore the HFOV angle of the virtual camera $2\beta$ can be calculated.

$$\beta=\arctan(\alpha*W/H), \beta<\pi/2 \quad (14)$$

When equirectangular or equidistant projection is employed, equation (15) for calculating $\beta$ can be derived, and therefore, the HFOV angle of the virtual camera $2\beta$ can be calculated.

$$\beta=\alpha*W/H. \quad (15)$$

From the relative position between the two spheres, equation (16) can be derived, based on which the HFOV angle $2\delta$ of the real camera can be calculated.

$$val=n*\cos\beta-n+1, \ \delta=\left\{\begin{array}{ll} \operatorname{arctg}((n*\sin\beta)/val), & val>0 \\ \pi/2, & val=0 \\ \pi+\operatorname{arctg}((n*\sin\beta)/val, & val<0 \end{array}\right\} \quad (16)$$

In this equation, val is an intermediate variable.

In comparison with perspective projection, cubic projection, cylindrical projection, rectangular projection and other basic projection methods, the present invention adds transformation between the two camera coordinate systems of the large and small spheres, which results in a modified transformation effect. In the fisheye image transformation algorithm based on virtual spheres provided in the present invention, first, defining the real camera coordinate system O-XYZ and the virtual camera coordinate system O2-X2Y2Z2, wherein the small virtual sphere centered at O with a radius of 1 and the large virtual sphere centered at O2 with a radius of n are defined. The small sphere is internally tangent to the large sphere. Next, a fisheye image is transformed to 3D unit vectors in the real camera coordinate system, the 3D unit vectors are transformed between the real camera coordinate system and the virtual camera coordinate system according to a relative position between two spheres, and the transformed image is generated by conducting conventional projection of the 3D unit vectors in the virtual camera coordinate system. A line curvature of the transformed image is reduced to a certain degree by adjusting the HFOV or VFOV angle of the virtual camera. In this way, with the HFOV or VFOV angle of the real camera being maintained constant, reduced line curvature is achieved, resulting in an improved visual effect of the transformed image. Further, an FOV angle range of 0 to 360 degrees is supported, which covers all fisheye lenses.

Further, the fisheye image transformation algorithm based on virtual spheres provided in the present invention comprises conventional projections including cylindrical projection, equirectangular projection and equidistant projection. It can be used in combination with multiple conventional projection methods to provide various transformation styles.

Figure 4A:
FIGS. 4a to 4d are schematic diagrams of images transformed using cylindrical projection.
Figure 4B:
Figure 4C:
Figure 4D:

FIGS. 4a to 4d are schematic diagrams of images transformed using cylindrical projection, in which FIG. 4a is obtained when the HFOV angle of the real camera is 140 degrees and the HFOV angle of the virtual camera is 80 degrees; FIG. 4b is obtained when the HFOV angle of the real camera is 140 degrees and the HFOV angle of the virtual camera is 100 degrees; FIG. 4c is obtained when the HFOV angle of the real camera is 140 degrees and the HFOV angle of the virtual camera is 120 degrees; and FIG. 4d is obtained by a conventional cylindrical projection with an HFOV angle of a real camera being 140 degrees. As can be seen from FIGS. 4a to 4d, compared with the conventional transformed image (i.e., FIG. 4d), the transformed images obtained with the use of the virtual camera have reduced line curvature and provide improved visual effects. With the virtual camera being used and the HFOV angle of the real camera being kept constant, line curvature of the transformed image decreases with the decrease of the virtual camera's HFOV angle, resulting in an increasingly improved visual effect of the transformed image. That is, FIG. 4a provides the best visual effect, while FIG. 4d has the worst angle of visual effect.

Figure 5A:
FIGS. 5a to 5d are schematic diagrams of images transformed using equirectangular projection.
Figure 5B:
Figure 5C:
Figure 5D:

FIGS. 5a to 5d are schematic diagrams of images transformed using equirectangular projection, in which FIG. 5a is obtained when the HFOV angle of the real camera is 140 degrees and the HFOV angle of the virtual camera is 80 degrees; FIG. 5b is obtained when the HFOV angle of the real camera is 140 degrees and the HFOV angle of the virtual camera is 100 degrees; FIG. 5c is obtained when the HFOV angle of the real camera is 140 degrees and the HFOV angle of the virtual camera is 120 degrees; and FIG. 5d is obtained by a conventional equirectangular projection with an HFOV angle of a real camera being 140 degrees. As can be seen from FIGS. 5a to 5d, compared with the conventional transformed image (i.e., FIG. 5d), the transformed images obtained with the use of the virtual camera have reduced line curvature and provide improved visual effects. With the virtual camera being used and the HFOV angle of the real camera being kept constant, line curvature of the transformed image decreases with the decrease of the virtual camera's HFOV angle, resulting in an increasingly improved visual effect of the transformed image. That is, FIG. 5a provides the best visual effect, while FIG. 5d has the worst angle of visual effect.

Figure 6A:
FIGS. 6a to 6d are schematic diagrams of images transformed using equidistant projection.
Figure 6B:
Figure 6C:
Figure 6D:

FIGS. 6a to 6d are schematic diagrams of images transformed using equidistant projection, in which FIG. 6a is obtained when the HFOV angle of the real camera is 140 degrees and the HFOV angle of the virtual camera is 80 degrees; FIG. 6b is obtained when the HFOV angle of the real camera is 140 degrees and the HFOV angle of the virtual camera is 100 degrees; FIG. 6c is obtained when the HFOV angle of the real camera is 140 degrees and the HFOV angle of the virtual camera is 120 degrees; and FIG. 6d is obtained by a conventional equidistant projection with an HFOV angle of a real camera being 140 degrees. As can be seen from FIGS. 6a to 6d, compared with the conventional transformed image (i.e., FIG. 6d), the transformed images obtained with the use of the virtual camera have reduced line curvature and provide improved visual effects. With the virtual camera being used and the HFOV angle of the real camera being kept constant, line curvature of the transformed image decreases with the decrease of the virtual camera's HFOV angle, resulting in an increasingly improved visual effect of the transformed image. That is, FIG. 6a provides the best visual effect, while FIG. 6d has the worst angle of visual effect.

The fisheye image transformation algorithm based on virtual spheres provided in the present invention can be used in OA798, OA805, OA8000, OA4600 and other related products comprising a DCPC module. In these applications, only coordinate mapping tables generated by the algorithm are stored in firmware, without needing to embed a code for the algorithm in the products.

The fisheye image transformation algorithm is designed to generate a mapping table between coordinates before and after transformation according to a user's transformation requirements. The coordinate mapping table is loaded before the DCPC module in the product run to enable the intended transformation function. Compared with conventional fisheye image transformation algorithm, the present invention can result in reduced line curvature at the same HFOV or VFOV angle, enabling to provide improved visual effects in the transformed images.

In summary, in the fisheye image transformation algorithm based on virtual spheres provided in the present invention, first, defining the real camera coordinate system O-XYZ and the virtual camera coordinate system O2-X2Y2Z2, wherein the small virtual sphere centered at O with a radius of 1 and the large virtual sphere centered at O2 with a radius of n are defined. The small sphere is internally tangent to the large sphere. Next, a fisheye image is transformed to 3D unit vectors in the real camera coordinate system, the 3D unit vectors are transformed between the real camera coordinate system and the virtual camera coordinate system according to a relative position between two spheres, and the transformed image is generated by conducting conventional projection of the 3D unit vectors in the virtual camera coordinate system. A line curvature of the transformed image is reduced to a certain degree by adjusting the HFOV or VFOV angle of the virtual camera. In this way, with the HFOV or VFOV angle of the real camera being maintained constant, reduced line curvature is achieved, resulting in an improved visual effect of the transformed image. Further, an FOV angle range of 0 to 360 degrees is supported, which covers all fisheye lenses.

Further, the fisheye image transformation algorithm based on virtual spheres provided in the present invention comprises conventional projections including cylindrical projection, equirectangular projection and equidistant projection. It can be used in combination with multiple conventional projection methods to provide various transformation styles.

The description presented above is merely that of some preferred embodiments of the present invention and is not intended to limit the scope thereof in any sense. Any and all changes and modifications made by those of ordinary skill in the art based on the above teachings fall within the scope as defined in the appended claims.

What is claimed is:

1. A method for reducing a distortion of a fisheye image captured by a fisheye lens, wherein the method is conducted by a processor to perform the following steps:
defining a real camera coordinate system O-XYZ, wherein a first virtual sphere centered at O with a radius of 1 is defined;
defining a virtual camera coordinate system O2-X2Y2Z2, wherein second virtual sphere centered at O2 with a radius of n is defined, and wherein the first virtual sphere is internally tangent to the second virtual sphere, and n>1;

transforming a fisheye image to three-dimensional (3D) unit vectors in the real camera coordinate system, transforming the 3D unit vectors between the real camera coordinate system and the virtual camera coordinate system according to a relative position between two spheres, and conducting a conventional projection of the 3D unit vectors in the virtual camera coordinate system to generate the transformed image; and reducing a line curvature of the transformed image to a certain degree by adjusting a horizontal field of view (HFOV) angle or a vertical field of view (VFOV) angle of the virtual camera, wherein a coordinate transformation of the fisheye image comprises a forward transformation and a reverse transformation, and wherein:

the forward transformation comprises: acquiring coordinates (x0, y0) of the fisheye image; deriving a 3D unit vector (i0, j0, k0) in the real camera coordinate system based on a camera model; deriving a 3D unit vector (i1, j1, k1) in the virtual camera coordinate system based on a coordinate transformation between the first and second virtual spheres; and deriving coordinates (x1, y1) in the transformed image by a conventional projection; and the reverse transformation comprises: acquiring the coordinates (x1, y1) in the transformed image; deriving the 3D unit vector (i1, j1, k1) in the virtual camera coordinate system based on a reverse conventional projection; deriving the 3D unit vector (i0, j0, k0) in the real camera coordinate system based on the coordinate transformation between the first and second virtual spheres; and deriving the coordinates (x0, y0) in the fisheye image using the camera model.

2. The method as defined in claim 1, wherein in the reverse transformation, deriving the 3D unit vector (i0, j0, k0) based on the 3D unit vector (i1, j1, k1) comprises:

acquiring coordinates (i1*n, j1*n, k1*n) in the coordinate system O2-X2Y2Z2 of an intersection of the 3D unit vector (i1, j1, k1) with the second sphere;

acquiring a vector (i1*n, j1*n, k1*n+(n−1)) of the intersection in the coordinate system O-XYZ; and normalizing the vector to the 3D unit vector (i0, j0, k0).

3. The method as defined in claim 1, wherein in the forward transformation, the 3D unit vector (i1, j1, k1) is derived based on the 3D unit vector (i0, j0, k0) according to equation (1):

$$\left\{ \begin{array}{l} i1 = i0*m/n \\ j1 = j0*m/n \\ k1 = (k0*m-(n-1))/n \end{array} \right\}, \text{where} \qquad (1)$$

$$m = k0*(n-1) + \sqrt{k0^2*(n-1)^2 + 2*n - 1}. \qquad (2)$$

4. The method as defined in claim 3, wherein: an equation (3) is derived based on a relative position between the two spheres; an equation (4) is derived based on equation (3); and the equation (2) is derived based on the equation (4):

$$\left\{ \begin{array}{l} i1*n = i0*m \\ j1*n = j0*m \\ k1*n + (n-1) = k0*m \\ i0*i0 + j0*j0 + k0*k0 = 1 \\ i1*i1 + j1*j1 + k1*k1 = 1 \\ m > 0, n > 1 \end{array} \right\}, \qquad (3)$$

$$\left\{ \begin{array}{c} m^2 - 2*k0*(n-1)*m - 2*n + 1 = 0 \\ m > 0, n > 1 \end{array} \right\} \qquad (4)$$

where m is an intermediate variable.

5. The method as defined in claim 1, wherein the conventional projection comprises a cylindrical projection, an equirectangular projection or an equidistant projection, and wherein a relationship between the HFOV and VFOV angles of the virtual camera is determined by a projection method and an aspect ratio of the transformed image.

6. The method as defined in claim 5, wherein with an HFOV angle of the real camera being configured as 2δ and the HFOV angle of the virtual camera as 2β, an equation (5) is derived based on the relative position between the two spheres, and an equation (6) for calculating n, the radius of the second sphere, is derived based on the equation (5):

$$\sin \delta *(n*\cos \beta - n + 1) = n*\sin \beta *\cos \delta, \ 0 < \beta < \delta < \pi, \qquad (5)$$

$$n = \sin \delta /(\sin \delta - \sin(\delta - \beta)), \qquad (6)$$

and wherein in order to make the radius of the second sphere n>1, δ and β need to satisfy an equation $$\left\{ \begin{array}{ll} 0 < \beta < \delta, & \text{if } 0 < \delta \le \pi/2 \\ 2*\delta - \pi < \beta < \delta, & \text{if } \pi/2 < \delta < \pi \end{array} \right\}. \qquad (7)$$

7. The method as defined in claim 6, wherein with the VFOV angle of the virtual camera being configured as 2α and a VFOV angle of the real camera as 2θ, and with a width of the transformed image being configured as W and a height thereof as H, in case of the cylindrical projection being used, an equation (8) for calculating α is derived:

$$\alpha = \text{arc } tg(\beta *H/W), \ \alpha < \pi/2, \qquad (8)$$

wherein in case of the equirectangular or equidistant projection being used, an equation (9) for calculating α is derived:

$$\alpha = \beta *H/W. \qquad (9)$$

8. The method as defined in claim 7, wherein: an equation (10) is derived based on the relative position between the two spheres; and an equation (11) for calculating θ is derived according to the equation (10):

$$\sin \theta *(n*\cos \alpha - n + 1) = n*\sin \alpha *\cos \theta, \ 0 < \alpha < \theta < \pi, \qquad (10)$$

$$val = n*\cos \alpha - n + 1, \ \theta = \left\{ \begin{array}{ll} \text{arc}tg((n*\sin \alpha)/val), & val > 0 \\ \pi/2, & val = 0 \\ \pi + \text{arc}tg((n*\sin \alpha)/val), & val < 0 \end{array} \right\}, \qquad (11)$$

where val is an intermediate variable.

9. The method as defined in claim 5, wherein with a VFOV angle of the real camera configured as 2θ and the VFOV angle of the virtual camera as 2α, an equation (12) for calculating n, the radius of the second sphere, is derived based on a relative position between the two spheres:

$$n = \sin \theta /(\sin \theta - \sin(\theta - \alpha)), \qquad (12),$$

and wherein in order to make the radius of the second sphere n>1, θ and α need to satisfy an equation (13):

$$\begin{cases} 0 < \alpha < \theta, & \text{if } 0 < \theta \le \pi/2 \\ 2*\theta - \pi < \alpha < \theta, & \text{if } \pi/2 < \theta < \pi \end{cases}. \tag{13}$$

10. The method as defined in claim 9, wherein with the HFOV angle of the virtual camera being configured as 2β and an HFOV angle of the real camera as 2δ, with a width of the transformed image being configured as W and a height thereof as H, in case of the cylindrical projection being used, an equation (14) for calculating β is derived:

$$\beta = \text{arc } tg(\alpha * W/H), \beta < \pi/2, \tag{14}$$

wherein in case of the equirectangular or equidistant projection being used, an equation (15) for calculating β is derived:

$$\beta = \alpha * W/H. \tag{15}$$

11. The method as defined in claim 10, wherein an equation (16) for calculating δ is derived based on the relative position between the two spheres:

$$val = n*\cos\beta - n + 1, \quad \delta = \begin{cases} \text{arc}tg((n*\sin\beta)/val), & val > 0 \\ \pi/2, & val = 0 \\ \pi + \text{arc}tg((n*\sin\beta)/val, & val < 0 \end{cases}, \tag{16}$$

where val is an intermediate variable.

* * * * *